(12) United States Patent
Blainey et al.

(10) Patent No.: US 10,389,800 B2
(45) Date of Patent: Aug. 20, 2019

(54) MINIMIZING EXECUTION TIME OF A COMPUTE WORKLOAD BASED ON ADAPTIVE COMPLEXITY ESTIMATION

(71) Applicant: International Business Machines Corporation, Armonk, NY (US)

(72) Inventors: Robert J. Blainey, Markham (CA); Daniel G. Foisy, Markham (CA); Heng Kuang, Quebec (CA); Taylor J. Lloyd, Alberta (CA); Ettore Tiotto, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/290,618

(22) Filed: Oct. 11, 2016

(65) Prior Publication Data

US 2018/0103088 A1   Apr. 12, 2018

(51) Int. Cl.
*G06F 15/173* (2006.01)
*H04L 29/08* (2006.01)
*H04L 12/24* (2006.01)
*H04L 29/06* (2006.01)

(52) U.S. Cl.
CPC ...... *H04L 67/1002* (2013.01); *H04L 41/0893* (2013.01); *H04L 41/50* (2013.01); *H04L 67/10* (2013.01); *H04L 67/1008* (2013.01); *H04L 67/42* (2013.01); *H04L 41/147* (2013.01)

(58) Field of Classification Search
CPC ...... H04L 67/1002; H04L 67/42; H04L 41/50
USPC .................................................. 709/223, 224
See application file for complete search history.

(56) References Cited

U.S. PATENT DOCUMENTS

| | | | | |
|---|---|---|---|---|
| 2010/0228861 A1* | 9/2010 | Arsovski | ............... | G06F 9/5027 709/226 |
| 2011/0191781 A1* | 8/2011 | Karanam | ................. | G06F 9/50 718/104 |
| 2012/0109936 A1* | 5/2012 | Zhang | ............... | G06F 17/30312 707/713 |

(Continued)

OTHER PUBLICATIONS

S. Gokuldev, et al., Task Graph Based Scheduling and Resource Monitoring in Grid Computing, IJERT, ISSN 278-0181, vol. 2, Issue 5, May 2013.

*Primary Examiner* — Philip B Tran
(74) *Attorney, Agent, or Firm* — Patterson + Sheridan, LLP

(57) ABSTRACT

The present disclosure relates to minimizing the execution time of compute workloads in a distributed computing system. An example method generally includes receiving, from each of a plurality of server clusters, an estimated completion time and cost information predicted to be consumed in processing the compute workload. A workload manager compares the received estimates to a completion time and threshold cost criteria. Upon determining that the estimated completion time and cost information from any of the plurality of server clusters does not satisfy the completion time and threshold cost criteria, the workload manager partitions the compute workload into a plurality of segments, requests estimated completion time and cost information from the plurality of server clusters for each of the plurality of segments, and selects a cluster to process each segment of the compute workload based on the estimated completion time and cost reported for each segment.

20 Claims, 5 Drawing Sheets

(56) References Cited

U.S. PATENT DOCUMENTS

| | | | |
|---|---|---|---|
| 2012/0180055 A1* | 7/2012 | Brech | G06F 9/4893 |
| | | | 718/102 |
| 2013/0007753 A1* | 1/2013 | Jain | G06F 9/46 |
| | | | 718/103 |
| 2013/0290298 A1 | 10/2013 | Weyerhaeuser et al. | |
| 2014/0229221 A1 | 8/2014 | Shih et al. | |
| 2014/0258499 A9 | 9/2014 | Calder et al. | |
| 2014/0359563 A1 | 12/2014 | Xie et al. | |
| 2015/0178419 A1* | 6/2015 | Li | G06F 9/5066 |
| | | | 703/2 |
| 2015/0295970 A1 | 10/2015 | Wang et al. | |
| 2016/0050262 A1 | 2/2016 | Kumar et al. | |
| 2016/0085587 A1* | 3/2016 | Dube | G06F 9/5011 |
| | | | 718/104 |
| 2016/0087909 A1* | 3/2016 | Chatterjee | H04L 47/70 |
| | | | 709/226 |
| 2016/0328273 A1 | 11/2016 | Molka et al. | |

* cited by examiner

MINIMIZING EXECUTION TIME OF A COMPUTE WORKLOAD BASED ON ADAPTIVE COMPLEXITY ESTIMATION

BACKGROUND

The present disclosure relates to processing compute workloads in a distributed computing system, and more specifically to using estimated completion time for a workload to identify one or more computing systems to use for processing a compute workload.

Infrastructure-as-a-service (IAAS) distributed computing systems generally include hardware, software, servers, storage, and other infrastructure components that can be used to process various compute workloads on an on-demand basis. A user generally requests computing resources (e.g., virtual and/or physical machines) from the IAAS system to use for processing a compute workload. An IAAS provider can identify idle resources in the distributed computing system available for use by new compute workloads and assign resources to the compute workload. When the resources assigned to a compute workload complete processing the workload, the resources are generally released and made available for use by new compute workloads.

Individual servers (virtual or physical) within a distributed computing system may have different characteristics (e.g., processing power, memory, power usage, locality to data used in a compute workload, and so on) and/or different compute workloads in a processing queue. Thus, a compute workload may be completed at different times based on the characteristics of the server the IAAS provider assigns for processing the compute workload. For example, a server with a number of large compute workloads in a processing queue may complete a new compute workload at a later time than a server with a small number of compute workloads of the same size (e.g., data processing requirements) or a large number of small compute workloads.

SUMMARY

One embodiment disclosed herein includes a method for processing a compute workload. The method generally includes receiving, from each of a plurality of server clusters, an estimated completion time and cost information predicted to be consumed in processing the compute workload. A workload manager compares the estimated completion time and cost information received from each of the plurality of server clusters to a completion time and threshold cost criteria. Upon determining that the estimated completion time and cost information from any of the plurality of server clusters does not satisfy the completion time and threshold cost criteria, the workload manager partitions the compute workload into a plurality of segments, requests estimated completion time and cost information from the plurality of server clusters for each of the plurality of segments, and selects a cluster to process each segment of the compute workload based on the estimated completion time and cost reported for each segment.

Another embodiment includes a computer-readable storage medium having instructions, which, when executed on a processor, performs an operation for processing a compute workload. The operation generally includes receiving, from each of a plurality of server clusters, an estimated completion time and cost information predicted to be consumed in processing the compute workload. A workload manager compares the estimated completion time and cost information received from each of the plurality of server clusters to a completion time and threshold cost criteria. Upon determining that the estimated completion time and cost information from any of the plurality of server clusters does not satisfy the completion time and threshold cost criteria, the workload manager partitions the compute workload into a plurality of segments, requests estimated completion time and cost information from the plurality of server clusters for each of the plurality of segments, and selects a cluster to process each segment of the compute workload based on the estimated completion time and cost reported for each segment.

Still another embodiment includes a processor and a memory storing a program, which, when executed on the processor, performs an operation for processing a compute workload. The operation generally includes receiving, from each of a plurality of server clusters, an estimated completion time and cost information predicted to be consumed in processing the compute workload. A workload manager compares the estimated completion time and cost information received from each of the plurality of server clusters to a completion time and threshold cost criteria. Upon determining that the estimated completion time and cost information from any of the plurality of server clusters does not satisfy the completion time and threshold cost criteria, the workload manager partitions the compute workload into a plurality of segments, requests estimated completion time and cost information from the plurality of server clusters for each of the plurality of segments, and selects a cluster to process each segment of the compute workload based on the estimated completion time and cost reported for each segment.

DETAILED DESCRIPTION

Embodiments presented herein describe techniques for assigning portions or a complete compute workload to one or more server clusters based on estimated completion time and cost data received from server clusters in a distributed computing system. A workload manager generally receives information about a workload, which may be a graph representing portions of a workload that can be executed in parallel and an order in which parallel portions of a compute workload can be executed. A workload manager can submit the information about a compute workload to a plurality of server clusters and request an estimated completion time and an estimated cost to process the compute workload. Based on the estimated completion time and cost to process the compute workload, the workload manager can either assign the compute workload to a server cluster or determine that the compute workload should be divided into a plurality of portions. If the workload manager divides the compute workload into a plurality of portions, the compute workload can request estimated completion time and processing cost information from the server clusters for each portion of the workload. The workload manager can assign each portion of the compute workload to a server cluster based on the estimated completion time and cost for each portion of the workload.

Advantageously, using completion time and cost estimates (or other estimates of resources needed to process a compute workload) to assign a compute workloads (or portions of a compute workload) to one or more server clusters allows a system administrator to minimize the resources (e.g., execution time and cost) used to process a compute workload. As server clusters process compute workloads, the server clusters can compare the estimated completion time to the actual completion time and update a model used to predict the execution time and cost for future compute workloads. By continually adjusting an execution time and cost model, server clusters in the distributed computing system can generate accurate estimates that workload manager can use to optimize assignment of compute workloads (or portions of compute workloads) within the distributed computing system.

Figure 1:
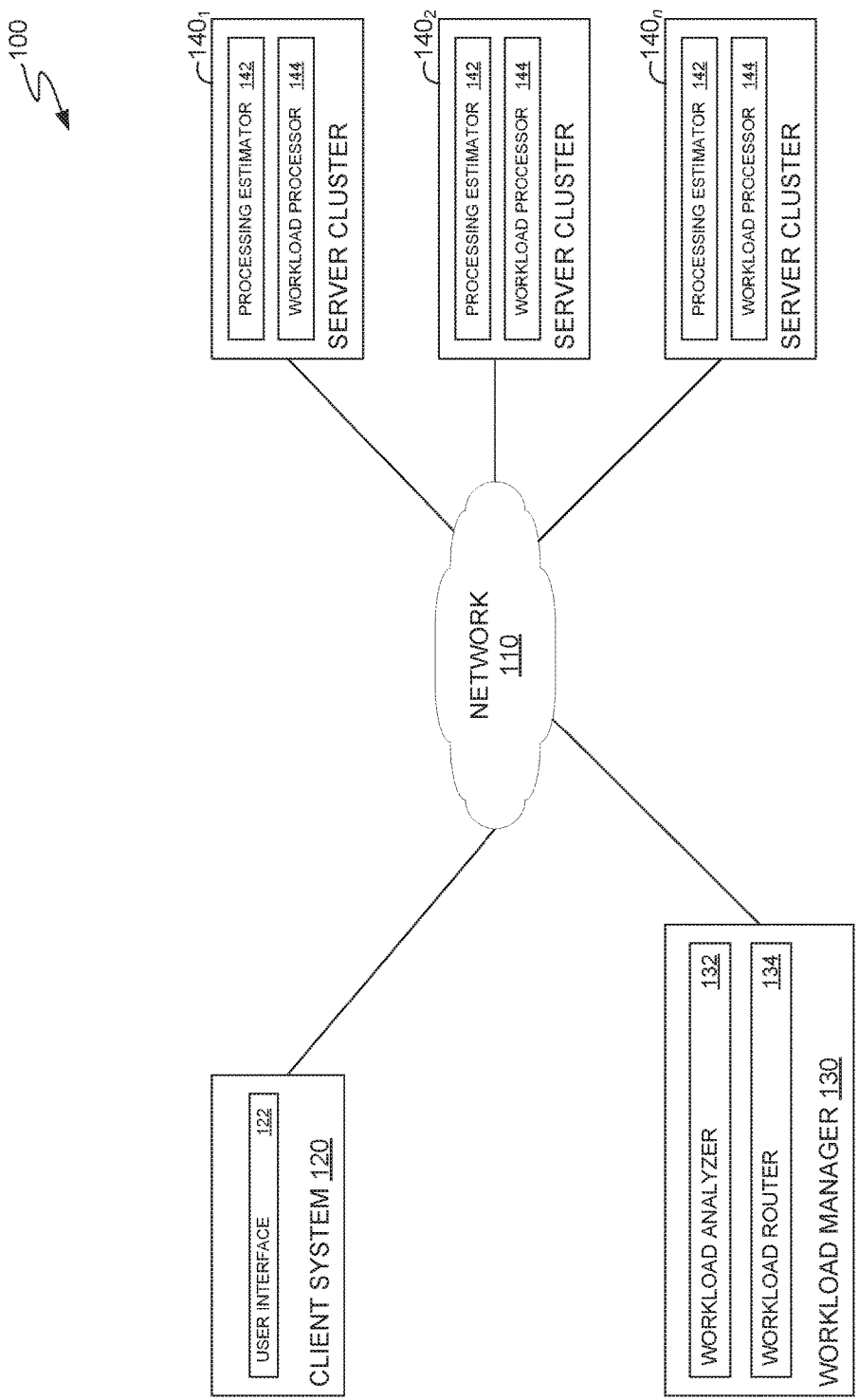
FIG. 1 illustrates an example of a networked computing environment, according to one embodiment.

FIG. 1 illustrates an example networked computing environment in which a workload manager uses estimated resource utilization (e.g., completion time and cost) to assign compute workloads to one or more server clusters, according to an embodiment. As illustrated, computing environment 100 generally includes a client system 120, workload manager 130, and a plurality of server clusters 140, connected via network 110.

Client system 120 generally allows a user to access a workload manager to request the provisioning of servers or server clusters to process a compute workload. As illustrated, client system includes a user interface 122. User interface 122 allows a user to connect to workload manager 130 to transmit information identifying a compute workload and parameters associated with the compute workload. The parameters may include, for example, a requested completion time (e.g., a deadline to complete the workload), a maximum cost for executing the compute workload, data locality restrictions, and so on. In some cases, where server clusters 140 do not allow tasks with a higher priority to preempt tasks with a lower priority, the maximum cost threshold may be used as a proxy for priority. Higher maximum cost thresholds for a workload may allow workload manager 130 to assign higher priority compute workloads, for example, to more expensive server clusters that may not be as heavily used as less expensive server clusters in distributed computing system 100.

In some cases, a user can transmit information identifying a compute workload as a computational graph. The computational graph generally identifies operations that may be executed in parallel and operational dependencies for each of the operations that compose the compute workload.

Workload manager 130 generally receives data identifying a compute workload and parameters associated with the compute workload from a client system 120 and identifies one or more server clusters 140 to allocate to the compute workload. As illustrated, workload manager generally includes a workload analyzer 132 and workload router 134.

Workload analyzer 132 is generally configured to request estimated resource utilization (e.g., completion time, cost, power usage, and so on) for a compute workload and determine whether to allocate a server cluster to process the compute workload or divide the compute workload into a plurality of portions to be independently executed across a plurality of server clusters. To request estimated completion time and cost for a compute workload, workload analyzer 132 can transmit information identifying the compute workload (e.g., a computational graph identifying groups of operations that may be executed in parallel and an order in which parallel operations are to be executed) to each of the server clusters 140 in distributed computing platform 100. In some cases, if operating parameters associated with a compute workload indicate that data used in the compute workload cannot cross geographical borders (e.g., that a compute workload is to be processed in its entirety in a single country), workload analyzer 132 can request estimated resource utilization from server clusters 140 that are located within a specified geographical area.

In response, workload analyzer 132 receives, from one or more server clusters 140, data identifying estimated resource utilization for the compute workload (e.g., completion time for the compute workload and an estimated cost to process the compute workload). To initiate a comparison of the received data to one or more user-provided parameters, workload analyzer 132 may wait until workload analyzer 132 receives estimated resource utilization information from a threshold number of server clusters 140. Workload analyzer 132 can compare the received data to one or more user-provided parameters to determine whether to assign the compute workload to a single server cluster 140 or divide the compute workload into a plurality of independently-assignable portions that can be executed on different server clusters 140. Generally, by requesting estimated resource utilization (e.g., completion time and cost information) from a plurality of server clusters 140 in distributed computing platform 100, workload analyzer 132 can adaptively assign compute workloads (or portions of a compute workload) in response to various problems within server clusters, a size of a data set processed by the compute workload, and so on.

For example, to determine whether to assign the compute workload to a single server cluster 140, workload analyzer 132 can compare the estimated completion times reported by the one or more server clusters 140 against a user-provided completion deadline for processing the compute workload. If at least one estimated completion time from the server clusters 140 in distributed computing platform 100 satisfies the completion deadline criteria, workload analyzer 132 can determine that the compute workload need not be divided into portions to be processed across different server clusters 140. Workload analyzer 132 may assign the compute workload to one of the server clusters 140 having a processing cost less than the user-specified maximum cost for the workload. The selected server cluster may be, for example, the server cluster 140 that reported the lowest cost for processing the compute workload or the server cluster 140 having an estimated cost less than the user-specified maximum cost and the earliest estimated time of completion. In some cases, workload analyzer 132 may select a server cluster to process the compute workload based on a combination of cost and estimated time of completion.

If, however, the estimated completion times for each of the one or more server clusters 140 are later than the user-specified completion deadline, workload analyzer 132 can determine that the compute workload should be partitioned for independent processing across the distributed computing platform 100. To partition (or divide) a workload, workload analyzer 132 can traverse a graph representation of the compute workload to identify process dependencies in the compute workload and portions (or groups) of the compute workload that can be executed in parallel. In a simple example, assume that a single compute workload (e.g., represented by a starting node in a graph representing of the compute workload) includes three dependencies, and each of the three dependencies can be executed in parallel. Workload analyzer 132 can partition the compute workload into four portions: one portion for each of the three dependencies that can be executed in parallel, and a fourth portion to complete processing after the dependencies have been executed.

Workload analyzer 132 may transmit information about each portion of the compute workload to the one or more server clusters 140 to obtain estimated completion time and processing cost information from each of the one or more server clusters 140. Based on the estimated completion time and processing cost information received for each portion of the compute workload, workload analyzer 132 may identify a set of server clusters 140 that satisfy the completion deadline and maximum cost criteria associated with the compute workload. In some cases, the set of server clusters 140 that satisfy the completion deadline and maximum cost criteria may be the set of server clusters that satisfies the completion deadline criteria (i.e., the set of clusters with an estimated completion time before the completion deadline) with the lowest cost. In some cases, the set of server clusters 140 workload analyzer 132 can select the set of clusters that satisfies the maximum cost criteria and has the shortest estimated completion time.

If workload analyzer 132 determines that neither assigning the compute workload to a single server cluster 140 nor partitioning the compute workload into portions that can be executed on multiple server clusters 140 satisfies the completion deadline and maximum cost criteria, workload analyzer 132 may transmit an alert to client system 120 indicating that the compute workload cannot be successfully performed using the user-provided criteria. In some cases, workload analyzer 132 can additionally report to a user a list of scenarios that would satisfy the user-provided criteria. The scenarios may include data indicating whether the compute workload is partitioned, an estimated completion time for processing the compute workload, an estimated cost to process the compute workload, and the identities of the one or more server clusters 140 that would be used to process the compute workload. Workload analyzer 132 may receive data from client system 120 indicating a selected scenario for processing the compute workload. Workload analyzer 132 can transmit data about the selected scenario (e.g., information about how the compute workload is to be partitioned and the server clusters to assign the compute workload to) to workload router 134 to queue the compute workload (or portions of the compute workload) for processing.

In some cases, workload analyzer 132 can indicate to a user (e.g., by transmitting an alert to be displayed in user interface 122 on client system 120) that the compute workload cannot be successfully executed within the user-provided time and cost constraints. Workload analyzer 132 may additionally provide information in the alert identifying the fastest estimated completion time and the lowest cost to execute the compute workload and request that the owner of the compute workload identify whether execution time or cost should be minimized. If the owner of the compute workload indicates that workload manager 130 is to prioritize completion time, workload analyzer can select the partitioning and one or more server clusters 140 with the earliest estimated completion time and transmit the compute workload partitioning and server cluster information to workload router 134. Otherwise, if the owner of the compute workload indicates that the execution cost for the compute workload should be prioritized, workload analyzer 132 can select the partitioning and one or more server clusters 140 with the lowest estimated cost and transmit the compute workload partitioning and server cluster information to workload router 134.

Workload router 134 generally receives information from workload manager to use in assigning compute workloads to one or more server clusters 140 for processing. The information may include one or more files containing the compute workload (e.g., a virtual machine configured to perform a particular task), data identifying how the compute workload is to be partitioned (if at all), and data identifying one or more server clusters 140 to be used for executing the compute workload. If the data received from workload analyzer 132 indicates that the workload can be executed on a single server cluster 140, workload router 134 can transmit the compute workload to be placed in an execution queue at the identified server cluster 140.

If the data received from workload analyzer 132 indicates that the compute workload is to be partitioned and processed across multiple server clusters 140 in distributed computing system 100, workload router 134 generally divides the workload into a plurality of portions according to the compute workload partitioning information received from workload analyzer 132. The partitioning information may include data identifying the a plurality of sub-graphs in a graph representation of the compute workload and an identity of the server cluster 140 that is assigned to process each portion of the compute workload defined by a sub-graph. Workload analyzer 132 can transmit each portion of the compute workload to the associated server cluster 140 in an order that is estimated to satisfy processing dependencies identified in the graph representation of the compute workload (e.g., scheduling parallel dependent processes to complete before a server cluster 140 begins processing a portion of the compute workload that depends upon completion of the parallel dependent processes).

In some cases, workload analyzer 132 can receive information from one or more server clusters 140 indicating the actual resource utilization (e.g., completion time, power usage, or other resource utilization metrics) for the compute workload. If workload analyzer 132 determines that a difference exists between the actual resource utilization and the estimated resource utilization for the compute workload (e.g., a completion time for the compute workload exceeding the estimated completion time by a threshold amount), workload analyzer 132 can update one or more prediction models at the server clusters 140 used to predict the estimated completion time for a compute workload.

Server clusters 140 generally provide the infrastructure for estimating and executing a compute workload (or a portion of a compute workload) transmitted to the server cluster from workload manager 130. As illustrated, each server cluster 140 generally includes a processing estimator 142 and a workload processor 144.

Processing estimator 142 generally receives data identifying a compute workload and estimates, based on the characteristics of the server cluster (e.g., processor speed, number of processor cores, number of threads supported per core, network bandwidth, network latency, and so on), a completion time for the compute workload and a cost to process the compute workload. The estimated completion time may take into account estimated completion times for other workloads queued at a server cluster 140 that are to be processed before server cluster begins processing the identified compute workload. In some cases, to estimate a completion time for a compute workload, processing estimator 142 may use a predictive model that uses information about the compute workload, such as a type of computation encoded in a graph representation of the compute workload or characteristics of the data processed by the compute workload. After processing estimator 142 generates an estimated completion time for the identified compute workload, processing estimator 142 can generate a cost estimate for the compute workload. The cost estimate may be based on a cost to use the server cluster per unit of time (e.g., cost per minute used by the server cluster to process the compute workload).

In some cases, processing estimator 142 may use a computation model and data size model to generate an estimated completion time for a compute workload. The data size model may be used to estimate the output data size of a portion of the compute workload (e.g., a vertex in a graph representation of the compute workload). The computation model uses the estimated output data size of a portion of the compute workload to estimate the computation time for each portion of the compute workload. To generate an estimated completion time for the compute workload, processing estimator 142 can traverse the graph representation of the compute workload and aggregate the total estimated time to process each portion of the compute workload into the estimated completion time for the compute workload. Processing estimator 142 can subsequently calculate the estimated cost to process the compute workload based on the estimated completion time for the compute workload.

If workload router 134 assigns a compute workload to a server cluster 140, processing estimator 142 may receive data from workload processor 144 indicating the actual elapsed time for processing the assigned compute workload. Processing estimator 142 may compare the actual elapsed time to the estimated completion time for the assigned compute workload to determine an accuracy of the estimate. In some cases, if the estimated completion time differs from the actual time measurement by a threshold amount (e.g., due to changes in the characteristics of the server cluster, such as increased latencies between server cluster 140 and external data sources), processing estimator 142 may adjust the model(s) used to predict completion times for future workloads. For example, processing estimator 142 may add a scaling factor to the computation model and/or data size model to reflect the actual performance of server cluster 140. When processing estimator 142 receives requests to estimate completion time and cost for subsequent workloads, processing estimator 142 can use the updated model to generate estimates for workload manager 130 to use in selecting a server cluster for processing a compute workload or determining that a compute workload should be split into independent portions for processing on different server clusters.

Workload processor 144 generally receives a compute workload (or a portion of a compute workload) from workload manager 130 for processing. Workload processor 144 may include a processing queue in which multiple compute workloads are stored for processing in a first-in, first-out manner (i.e., compute workloads assigned to workload processor 144 earlier are processed before compute workloads assigned later). When workload processor 144 receives a compute workload for processing, workload processor 144 may store the compute workload in the queue and begin processing the compute workload when the compute workload reaches the front of the queue. Upon processing the compute workload, workload processor 144 may transmit the results of the workload to a location designated in a description of the compute workload (e.g., to another server cluster 140 used to process a parent node in a graph representation of the compute workload, to workload manager 130 for routing to other server clusters, or to client system 120).

As discussed above, workload processor 144 may include a timer used to determine an elapsed time for processing a compute workload (or a portion of a compute workload). The timer may begin when workload processor 144 begins processing a compute workload (e.g., when workload processor reads information about a compute workload from the front of a queue to commence workload processing). The timer may stop when workload processor 144 reaches an end condition of the compute workload defined by information received from workload manager 130.

Figure 2:
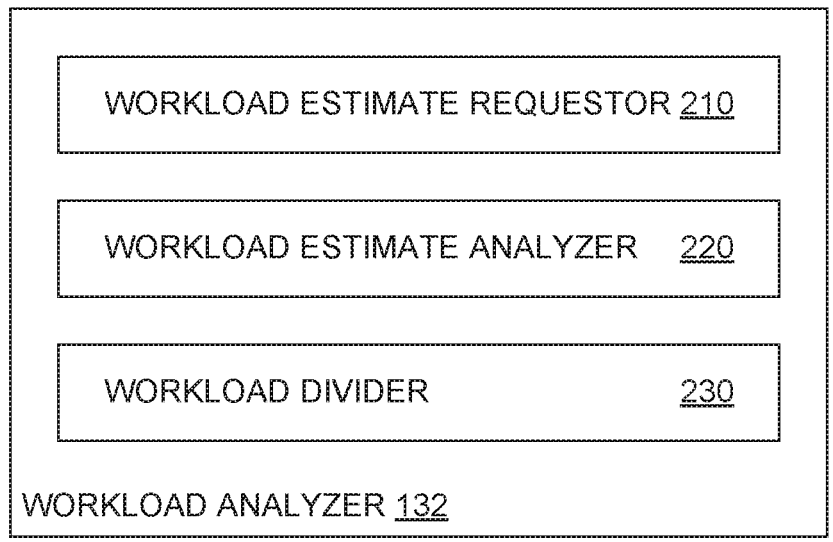
FIG. 2 is a block diagram illustrating an example workload analyzer, according to one embodiment.

FIG. 2 illustrates an example workload analyzer 132, according to an embodiment. As illustrated, workload analyzer 132 generally includes a workload estimate requestor 210, workload estimate analyzer 220, and workload divider 230.

Workload estimate requestor 210 generally receives, from a client system 120, data identifying a compute workload to be processed by one or more server clusters 140 in distributed computing environment 100. As discussed, the data identifying the compute workload may include a graph representation of the compute workload identifying parallel workflows, workload dependencies, information about the compute workload encoded in the graph, and so on. Workload estimate requestor 210 generally transmits the data identifying the compute workload to each of the one or more server clusters 140 in distributed computing platform 100 to request an estimated completion time and cost to process the compute workload.

In some cases, if workload estimate analyzer 220 determines that executing the compute workload using a single server cluster 140 would not meet the user-defined execution deadline and/or cost (e.g., the compute workload on a single server cluster is estimated to complete after the execution deadline and/or incur expenses above a threshold cost), workload estimate analyzer 220 can receive compute workload partitioning information from workload estimate analyzer 220. The compute workload partitioning information may indicate, for example, portions of the compute workload that may be executed in parallel and an order in which portions of the compute workload should be executed. Workload estimate requestor 210 may transmit information about each portion of the compute workload to each server cluster 140 in distributed computing platform 100.

Workload estimate analyzer 220 generally receives completion time and cost estimates from the one or more server clusters 140 in distributed computing platform 100 and identifies one or more server clusters 140 to use for processing a compute workload. Workload estimate analyzer 220 can examine each of the completion time and cost estimates to identify any server clusters 140 that can execute the compute workload and satisfy the execution time and cost criteria associated with the compute workload. If workload estimate analyzer 220 identifies one or more server clusters 140 associated with estimated completion times and costs that satisfy the execution time and cost criteria, workload estimate analyzer 220 transmit the compute workload to one of the identified server clusters 140 to insert the compute workload in a processing queue at the one of the identified server clusters 140.

If workload estimate analyzer 220 determines that none of the server clusters 140 can process the compute workload and satisfy the execution time and cost criteria, workload estimate analyzer 220 can request that workload divider 230 partition the compute workload into a plurality of independently executable portions. Workload estimate analyzer 220 can invoke workload estimate requestor to request estimated execution time and cost information for each of the executable portions of the compute workload from each of the server clusters 140. Based on the estimated execution time and cost information for each of the executable portions of the compute workload, workload estimate analyzer 220 can attempt to identify a set of server clusters 140 that can process the compute workload and satisfy the execution time and cost criteria. If workload estimate analyzer 220 determines that no combination of server clusters and portions of the compute workload satisfy the execution time and cost criteria, workload estimate analyzer 220 can transmit an alert to client system 120 indicating that the compute workload cannot be processed under the execution time and cost criteria specified for the compute workload. In some cases, as discussed herein, the alert may request that a user determine whether to prioritize execution time or execution cost (e.g., whether the compute workload should be processed sooner or whether the compute workload should be processed at the lowest cost).

Workload divider 230 generally receives, from workload estimate analyzer 220, information identifying a compute workload to identify portions of the compute workload that can be processed in parallel and an order in which groups of portions of the compute workload should be executed. The information identifying the compute workload may be, for example, a computational graph identifying dependencies in the compute workload and portions of the compute workload that multiple server clusters 140 can execute substantially in parallel. As discussed, workload divider 230 may partition a compute workload, for example, when workload estimate analyzer 220 determines that no single server cluster can process the compute workload and satisfy execution deadline and/or cost criteria associated with a compute workload. Workload divider 230 can provide data identifying the determined partitioning for the compute workload to workload estimate analyzer, which, as discussed above, requests estimated completion time and cost information from the server clusters 140 for each of the portions of the compute workload to determine how to distribute the compute workload.

Figure 3:
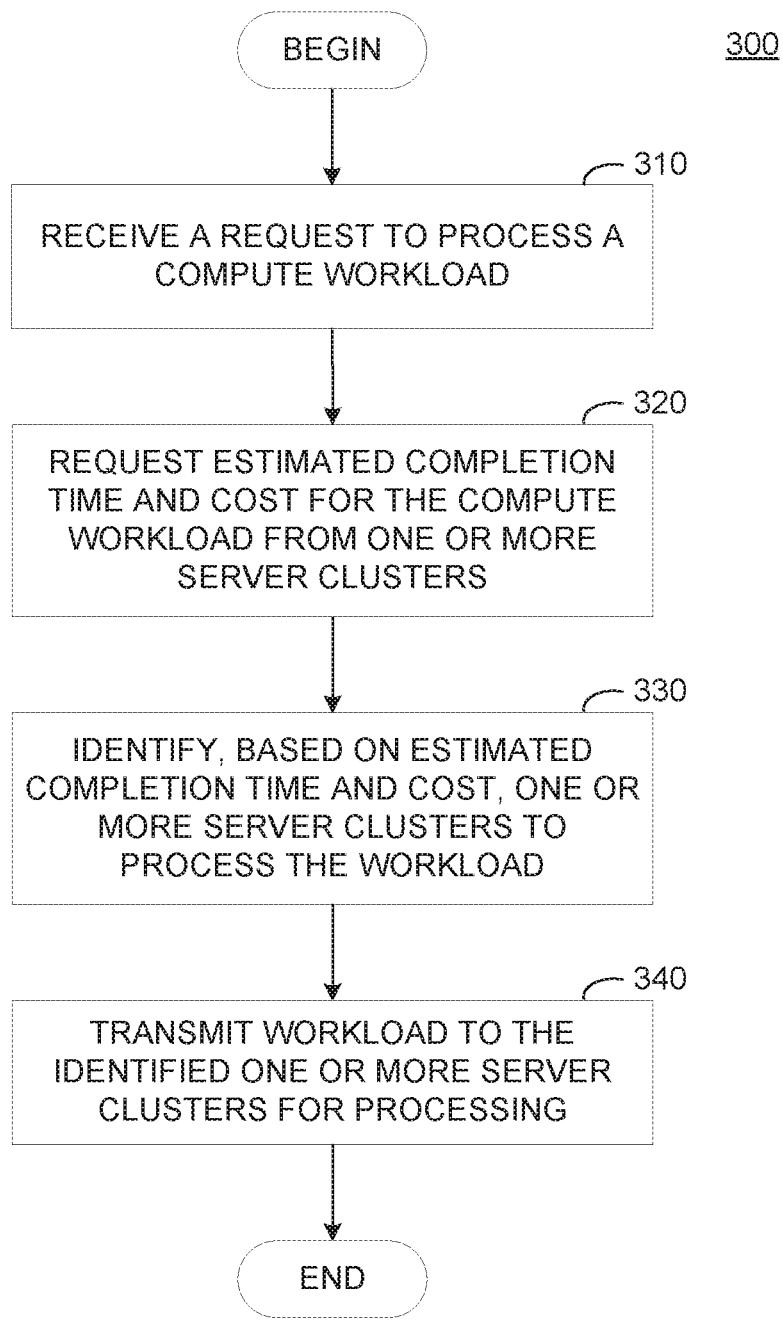
FIG. 3 illustrates a method for assigning a compute workload to one or more server clusters, according to one embodiment.

FIG. 3 illustrates example operations 300 that may be performed, for example, by workload manager 130 to identify a server cluster 140 for processing a compute workload, according to an embodiment. As illustrated, operations 300 begin at step 310, where workload manager 130 receives a request to process a compute workload. The request to process the compute workload may include, for example, a graph representation of the compute workload and one or more criteria for processing the compute workload. The one or more criteria may include, for example, a deadline for processing the compute workload and a maximum cost for processing the compute workload. The graph representation of the compute workload may, for example, identify dependencies in the compute workload and processes that can be executed in parallel (e.g., on different server clusters).

At step 320, workload manager 130 requests an estimated completion time and cost (and/or other estimated resource utilization metrics) for the compute workload from one or more server clusters. As discussed, to request estimates from a server cluster, workload manager 130 can transmit information about the compute workload (e.g., a graph representation of the compute workload identifying processes that can be executed in parallel and process dependencies in the compute workload) to each of the one or more server clusters 140 in distributed computing platform 100. In some cases, the one or more server clusters may be server clusters located within a specified geographical area to satisfy data locality constraints for the compute workload (e.g., that data used or generated by the compute workload cannot leave a specified geographical area or cannot enter a specified geographical area). In response, workload manager 130 receives data indicating an estimated completion time and an estimated cost to process the workload from each of the server clusters 140.

At step 330, workload manager 130 identifies, based on the estimated completion time and cost, one or more server clusters to process the workload. Workload manager 130 can identify one or more server clusters to process the workload by comparing the estimated completion time and cost information for each server cluster 140 to a threshold completion time and cost defined for the compute workload. If the estimated completion time and cost for at least one server cluster 140 in distributed computing platform satisfies the completion deadline and cost thresholds defined for the compute workload, workload manager 130 can select a single server cluster 140 to process the compute workload, for example, having the soonest estimated completion time or the lowest processing cost. Otherwise, workload manager 130 can divide the compute workload into a plurality of tasks and identify a set of server clusters 140 to process the compute workload.

At step 340, workload manager 130 transmits the compute workload to the identified server clusters for processing. When a server cluster 140 receives a compute workload (or a portion of a compute workload), the server cluster 140 adds the compute workload to a processing queue, and server cluster 140 processes workloads in the order in which the workloads were added to the queue.

Figure 4:
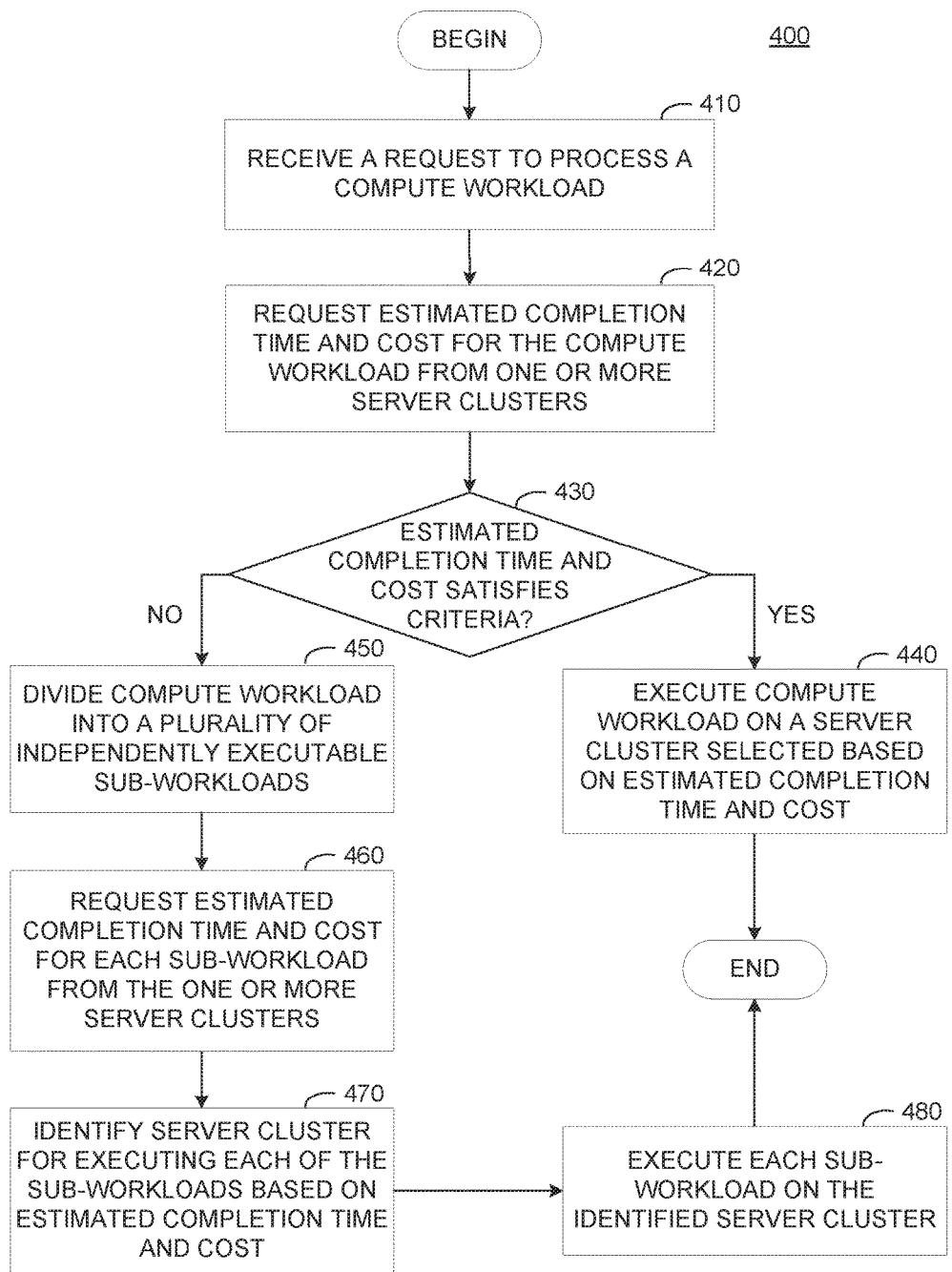
FIG. 4 illustrates a method for assigning portions of a compute workload to one or more server clusters based on an estimated completion cost of the compute workload, according to one embodiment.

FIG. 4 illustrates example operations 400 for assigning a workload to one or more server clusters for processing, according to an embodiment. As illustrated, operations 400 begin at step 410, where workload manager 130 receives a request to process a compute workload. At step 420, workload manager 130 requests estimated completion time and cost information for the compute workload from one or more server clusters in the distributed computing platform. In some cases, the one or more server clusters may be server clusters located within a specified geographical area to satisfy data locality constraints for the compute workload (e.g., that data used or generated by the compute workload cannot leave a specified geographical area or cannot enter a specified geographical area).

At step 430, workload manager 130 determines if an estimated completion time and cost (or other estimated resource utilization metrics) satisfy completion deadline and maximum cost criteria (or other resource utilization criteria) defined for the compute workload. If an estimated completion time and cost reported by at least one of the server clusters satisfies the criteria for the compute workload, at step 440, workload manager selects a server cluster to process the compute workload based on estimated completion time and cost and transmits the compute workload to the selected server cluster for processing. As discussed above, workload manager 130 can, for example, select the server cluster that reported the earliest estimated completion time or the server cluster that satisfies the completion deadline and reported the lowest cost to process the compute workload.

If, at step 430, workload manager 130 determines that none of the server clusters reported an estimated completion time and/or processing cost (or other estimated resource utilization metrics) that satisfy the completion deadline and maximum cost criteria (or other resource utilization criteria), at step 450, workload manager 130 divides the compute workload into a plurality of independently executable sub-workloads. To divide the compute workload into a plurality of independently executable sub-workloads, workload manager 130 can examine, for example, a graph representation of the compute workload that illustrates relationships between different portions of the compute workload. The graph representation may illustrate, for example, process dependencies and processes that can be executed in parallel on different server clusters. Based on the graph representation of the compute workload, workload manager 130 can generate an ordered set of operations to be performed by a plurality of server clusters 140 in distributed computing system 100.

At step 460, workload manager 130 requests estimated completion time and cost (or other estimated resource utilization metrics) for each sub-workload from the one or more server clusters 140 in distributed computing system 100. In some cases, the one or more server clusters may be the server clusters located within a specified geographical area to satisfy data locality constraints for the compute workload (e.g., that data used or generated by the compute workload cannot leave a specified geographical area or cannot enter a specified geographical area).

At step 470, workload manager identifies a server cluster for processing each of the sub-workloads based on the estimated completion time and cost. For example, workload manager 130 can select the plurality of server that minimizes the combined execution time and processing cost for the whole compute workload. To minimize the combined execution time for processing the whole compute workload, workload manager 130 can, for example, identify groups of parallel sub-workflows and identify the set of server clusters 140 for processing the parallel sub-workflows that results having the shortest estimated completion time. At step 480, workload manager executes each sub-workload on the identified server cluster 140 associated with each sub-workload.

Figure 5:
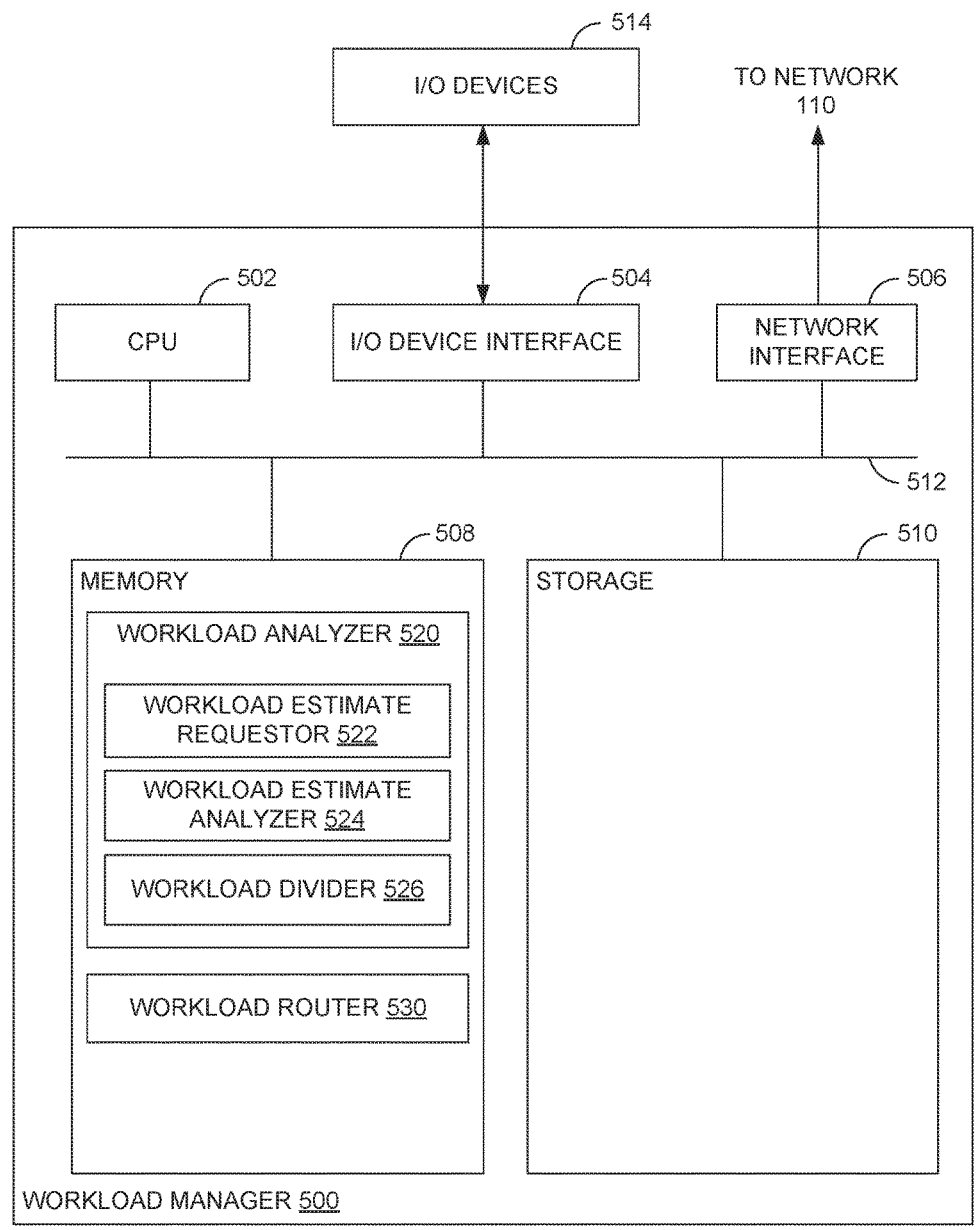
FIG. 5 illustrates an example workload manager that uses estimated completion time and cost information from server clusters to assign at least portions of a compute workload to one or more server clusters, according to one embodiment.

FIG. 5 illustrates an example workload manager 500 that uses estimated completion time and cost information to assign compute workloads to one or more server clusters in a distributed computing system, according to an embodiment. As shown, transaction processing system 500 includes, without limitation, a central processing unit 502, one or more I/O device interfaces 504, which may allow for the connection of various I/O devices 514 (e.g., keyboards, displays, mouse devices, pen input, etc.) to the entity analytics system 500, network interface 506, a memory 508, storage 510, and an interconnect 512.

CPU 502 may retrieve and execute programming instructions stored in the memory 508. Similarly, the CPU 502 may retrieve and store application residing in the memory 508. The interconnect 512 transmits programming instructions and application data among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive. Although shown as a single unit, the storage 510 may be a combination of fixed and/or removable storage devices, such as fixed disc drives, solid state drives, removable memory cards or optical storage, network attached storage (NAS), or a storage area-network (SAN).

As illustrated, memory 508 includes a workload analyzer 520 and a workload router 530. Workload analyzer 520 generally includes a workload estimate requestor 522, workload estimate analyzer 524, and a workload divider 526 and generally identifies, based on estimate data received from server clusters 140 in distributed computing platform 100, one or more clusters for processing the compute workload. As discussed, workload analyzer 520 generally receives, from a client device, data about a compute workload to be processed by one or more server clusters 140 in distributed computing platform 100 and user-defined thresholds defining a deadline for processing the compute workload and a maximum cost for processing the compute workload.

Workload estimate requestor 522 generally transmits data about a compute workload (or a portion of a compute workload) to one or more server clusters 140 and requests an estimated completion time and cost to process the compute workload (and/or other estimated resource utilization metrics) on each server cluster 140 in distributed computing platform 100. In response, workload estimate requestor 522 receives estimated completion time and processing cost data (and/or other estimated resource utilization data) from each of the one or more server clusters 140 and provides the estimated completion time and processing cost data to workload estimate analyzer 524 for analysis. In some cases, if workload estimate analyzer 524 determines that the estimated completion time and processing cost from each of the one or more server clusters 140 do not satisfy the completion time and processing cost criteria, workload estimate requestor 522 may request estimated completion time and cost data for portions of the compute workload.

Workload estimate analyzer 524 generally compares the estimated completion time and processing cost information from each of the server clusters 140 to a completion deadline and maximum cost criteria defined for the workload. If workload estimate analyzer 524 identifies at least one server cluster 140 as an acceptable cluster for processing the compute workload (e.g., identifies at least one cluster that reported an estimated completion time and cost that satisfy the completion deadline and maximum cost criteria), workload estimate analyzer 524 can determine that the compute workload can be successfully processed by a single server cluster 140. Workload estimate analyzer 524 may subsequent provide information about the compute workload to a workload router 530 for routing to a server cluster 140. Workload estimate analyzer 524 may additionally provide data identifying the selected server cluster to workload router 530.

If workload estimate analyzer 524 determines that the compute workload cannot be processed by a single server cluster 140 within the execution deadline and maximum cost criteria associated with the compute workload, workload estimate analyzer 524 can request that workload divider 526 partition the compute workload. Workload divider 526 generally examines a computational graph representing the compute workload to identify workloads that can be executed in parallel (or substantially in parallel) and an order in which portions of the compute workload are to be executed. After determining a partitioning for the compute workload, workload divider 526 can provide the partitioning information to workload estimate requestor 522 for workload estimate requestor 522 to obtain estimated completion time and processing cost for each portion of the compute workload.

Workload router 530 generally receives, from workload analyzer 520, information about a compute workload and routing instructions for the compute workload. If the information includes routing instructions to queue the compute workload at a single server cluster 140, workload router 530 can transmit information about the compute workload to the identified server. If the information includes multiple destination server clusters, workload router 530 can determine that workload analyzer has partitioned the compute workload and can queue portions of the compute workload at identified server clusters 140 according to an order in which portions of the compute workload are to be executed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the entity analytics system) or related data available in the cloud. For example, the entity analytics system could execute on a computing system in the cloud and determine relationships between different entities stored in the entity analytics system, for example, based on determining relationships between sub-entities. In such a case, the entity analytics system could receive an input specifying parameters for the entity analytics system to search for and determine relationships between entities and store information about the determined relationships at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a Blu-Ray disk, a memory stick, removable flash memory (e.g., portable Universal Serial Bus memory sticks, Compact Flash, Secure Digital, etc.), a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for processing compute workloads, the method comprising:
    receiving, by a workload manager, from a client device, a request to process a first compute workload;
    transmitting, to each of a plurality of server clusters, a request for estimated completion time and cost information predicted to be consumed in processing the first compute workload;
    receiving a first plurality of estimated completion times and a first plurality of cost information predicted to be consumed in processing the first compute workload, from at least two of the plurality of server clusters;
    determining that a number of server clusters that have provided estimated completion times and cost information exceeds a predefined threshold number of server clusters;
    comparing the first plurality of estimated completion times and the first plurality of cost information received from each of the plurality of server clusters to a first completion time and threshold cost criteria;
    determining that none of the plurality of server clusters can service the first compute workload, based on determining that none of the first plurality of estimated completion times and first plurality of cost information satisfies the first completion time and threshold cost criteria; and
    upon determining that none of the plurality of server clusters can service the first compute workload:
        partitioning the compute workload into a plurality of segments;
        transmitting, to each of the plurality of server clusters, a request for a second plurality of estimated completion times and a second plurality of cost information, wherein each of the plurality of estimated completion times and each of the plurality of cost information corresponds to one of the plurality of segments;
        receiving, from each of the plurality of server clusters, the second plurality of estimated completion times and the second plurality of cost information predicted to be consumed in processing each of the plurality of segments; and
        selecting at least two of the plurality of server clusters to process the plurality of segments of the first compute workload based on the second plurality of estimated completion times and the second plurality of cost information.

2. The method of claim 1, wherein partitioning the first compute workload into a plurality of segments comprises:
    identifying segments of the first compute workload that can be executed in parallel;
    dividing the first compute workload in to a plurality of groups, each group including one or more compute workloads that can be executed in parallel; and
    ordering the plurality of groups based on dependencies identified for each of the plurality of groups.

3. The method of claim 1, further comprising:
    receiving a request to process a second compute workload;
    transmitting, to each of the plurality of server clusters, a request for estimated completion time and cost information predicted to be consumed in processing the second compute workload;
    receiving a third plurality of estimated completion times and cost information predicted to be consumed in processing the second compute workload, from the plurality of server clusters;
    comparing the third plurality of estimated completion times and cost information received from each of the plurality of server clusters to a second completion time and threshold cost criteria;
    determining that at least one of the third plurality of estimated completion times and cost information satisfies the second completion time and threshold cost criteria, wherein the at least one of the third plurality of estimated completion times and cost information corresponds to a first server cluster of the plurality of server clusters; and
    selecting the first server cluster to process the second compute workload.

4. The method of claim 1, wherein the completion time criteria comprises a processing deadline for the first compute workload.

5. The method of claim 1, wherein transmitting, to each of the plurality of server clusters, a plurality of requests for estimated completion time and cost information comprises transmitting, to each of the plurality of server clusters, data identifying an order in which the plurality of segments are to be performed and groups of segments in the plurality of segments that can be executed in parallel.

6. The method of claim 5, wherein the data identifying an order in which the plurality of segments are to be performed and groups of segments in the plurality of segments that can be executed in parallel comprises a computational graph representing the first compute workload.

7. The method of claim 5, wherein the data further comprises information about an estimated amount of output data for each segment of the plurality of segments, wherein the second plurality of estimated completion times and cost information is based at least in part on the estimated amount of output data for each segment.

8. The method of claim 1, further comprising:
    receiving information about an actual completion time for each segment of the first compute workload; and
    determining that the actual completion time for at least one of the plurality of segments at a first server cluster exceeds a corresponding estimated completion time and cost information received from the first server cluster by a predefined threshold; and
    updating a prediction model corresponding to the first server cluster for estimating the completion time of the compute workload based on a difference between the actual completion time and estimated completion time for the segment of the first compute workload.

9. A system, comprising:
    a processor; and
    a memory comprising instructions which, when executed on the processor, performs an operation for processing a compute workload, the operation comprising:
        receiving, by a workload manager, from a client device, a request to process a first compute workload;

transmitting, to each of a plurality of server clusters, a request for estimated completion time and cost information predicted to be consumed in processing the first compute workload;

receiving a first plurality of estimated completion times and a first plurality of cost information predicted to be consumed in processing the first compute workload, from at least two of the plurality of server clusters;

determining that a number of server clusters that have provided estimated completion times and cost information exceeds a predefined threshold number of server clusters;

comparing the first plurality of estimated completion times and the first plurality of cost information received from each of the plurality of server clusters to a first completion time and threshold cost criteria;

determining that none of the plurality of server clusters can service the first compute workload, based on determining that none of the first plurality of estimated completion times and first plurality of cost information satisfies the first completion time and threshold cost criteria; and upon determining that none of the plurality of server clusters can service the first compute workload:
partitioning the compute workload into a plurality of segments;
transmitting, to each of the plurality of server clusters, a request for a second plurality of estimated completion times and a second plurality of cost information, wherein each of the plurality of estimated completion times and each of the plurality of cost information corresponds to one of the plurality of segments;
receiving, from each of the plurality of server clusters, the second plurality of estimated completion times and the second plurality of cost information predicted to be consumed in processing each of the plurality of segments; and
selecting at least two of the plurality of server clusters to process the plurality of segments of the first compute workload based on the second plurality of estimated completion times and second plurality of cost information.

10. The system of claim 9, wherein partitioning the first compute workload into a plurality of segments comprises:
identifying segments of the first compute workload that can be executed in parallel;
dividing the first compute workload in to a plurality of groups, each group including one or more compute workloads that can be executed in parallel; and
ordering the plurality of groups based on dependencies identified for each of the plurality of groups.

11. The system of claim 9, the operation further comprising:
receiving a request to process a second compute workload;
transmitting, to each of the plurality of server clusters, a request for estimated completion time and cost information predicted to be consumed in processing the second compute workload;
receiving a third plurality of estimated completion times and cost information predicted to be consumed in processing the second compute workload, from the plurality of server clusters;

comparing the third plurality of estimated completion times and cost information received from each of the plurality of server clusters to a second completion time and threshold cost criteria;
determining that at least one of the third plurality of estimated completion times and cost information satisfies the second completion time and threshold cost criteria, wherein the at least one of the third plurality of estimated completion times and cost information corresponds to a first server cluster of the plurality of server clusters; and
selecting the first server cluster to process the second compute workload.

12. The system of claim 9, wherein transmitting, to each of the plurality of server clusters, a plurality of requests for estimated completion time and cost information comprises transmitting, to each of the plurality of server clusters, data identifying an order in which the plurality of segments are to be performed and groups of segments in the plurality of segments that can be executed in parallel.

13. The system of claim 12, wherein the data identifying an order in which the plurality of segments are to be performed and groups of segments in the plurality of segments that can be executed in parallel comprises a computational graph representing the first compute workload.

14. The system of claim 12, wherein the data further comprises information about an amount of data to be processed in each segment in the plurality of segments.

15. A computer-readable storage medium comprising instructions which, when executed by a processor, performs an operation for processing a compute workload, the operation comprising:
receiving, by a workload manager, from a client device, a request to process a first compute workload;
transmitting, to each of a plurality of server clusters, a request for estimated completion time and cost information predicted to be consumed in processing the first compute workload;
receiving a first plurality of estimated completion times and a first plurality of cost information predicted to be consumed in processing the first compute workload, from at least two of the plurality of server clusters;
determining that a number of server clusters that have provided estimated completion times and cost information exceeds a predefined threshold number of server clusters;
comparing the first plurality of estimated completion times and the first plurality of cost information received from each of the plurality of server clusters to a first completion time and threshold cost criteria;
determining that none of the plurality of server clusters can service the first compute workload, based on determining that none of the first plurality of estimated completion times and first plurality of cost information satisfies the first completion time and threshold cost criteria; and
upon determining that none of the plurality of server clusters can service the first compute workload:
partitioning the compute workload into a plurality of segments;
transmitting, to each of the plurality of server clusters, a request for a second plurality of estimated completion times and a second plurality of cost information, wherein each of the plurality of estimated completion times and each of the plurality of cost information corresponds to one of the plurality of segments;

receiving, from each of the plurality of server clusters, the second plurality of estimated completion times and the second plurality of cost information predicted to be consumed in processing each of the plurality of segments; and selecting at least two of the plurality of server clusters to process the plurality of segments of the first compute workload based on the second plurality of estimated completion times and second plurality of cost information.

16. The computer-readable storage medium of claim 15, wherein partitioning the first compute workload into a plurality of segments comprises:

identifying segments of the first compute workload that can be executed in parallel;

dividing the first compute workload in to a plurality of groups, each group including one or more compute workloads that can be executed in parallel; and ordering the plurality of groups based on dependencies identified for each of the plurality of groups.

17. The computer-readable storage medium of claim 15, the operation further comprising:

receiving a request to process a second compute workload;

transmitting, to each of the plurality of server clusters, a request for estimated completion time and cost information predicted to be consumed in processing the second compute workload;

receiving a third plurality of estimated completion times and cost information predicted to be consumed in processing the second compute workload, from the plurality of server clusters;

comparing the third plurality of estimated completion times and cost information received from each of the plurality of server clusters to a second completion time and threshold cost criteria;

determining that the at least one of the third plurality of estimated completion times and cost information satisfies the second completion time and threshold cost criteria, wherein the at least one of the third plurality of estimated completion times and cost information corresponds to a first server cluster of the plurality of server clusters; and selecting the first server cluster to process the second compute workload.

18. The computer-readable storage medium of claim 15, wherein transmitting, to each of the plurality of server clusters, a plurality of requests for estimated completion time and cost information comprises transmitting, to each of the plurality of server clusters, data identifying an order in which the plurality of segments are to be performed and groups of segments in the plurality of segments that can be executed in parallel.

19. The computer-readable storage medium of claim 18, wherein the data identifying an order in which the plurality of segments are to be performed and groups of segments in the plurality of segments that can be executed in parallel comprises a computational graph representing the first compute workload.

20. The computer-readable storage medium of claim 18, wherein the data further comprises information about an amount of data to be processed in each segment in the plurality of segments.

* * * * *